US012647313B2

(12) United States Patent
Syed et al.

(10) Patent No.: US 12,647,313 B2

(45) Date of Patent: Jun. 2, 2026

(54) CRASH RESPONSE ASSISTANCE SYSTEM FOR FAILURES OF PHYSICAL SERVERS HOSTING VIRTUAL MACHINES

(71) Applicant: BANK OF AMERICA CORPORATION, Charlotte, NC (US)

(72) Inventors: Kareemuddin Syed, Hyderabad (IN); Sunny Bhattacharjee, Ghaziabad (IN); Ganesh Javvadi, Hyderabad (IN); Rohit Prakash Kadam, Pune (IN); Surya Pradeep V V S Sundarapu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 31 days.

(21) Appl. No.: 18/751,948

(22) Filed: Jun. 24, 2024

(65) Prior Publication Data

US 2025/0392507 A1 Dec. 25, 2025

(51) Int. Cl.
*H04L 41/0654* (2022.01)
*H04L 41/0604* (2022.01)
*H04L 41/5074* (2022.01)

(52) U.S. Cl.
CPC ...... *H04L 41/0654* (2013.01); *H04L 41/0627* (2013.01); *H04L 41/5074* (2013.01)

(58) Field of Classification Search
CPC ............. H04L 41/5074; H04L 41/0627; H04L 41/0654; H04L 41/507; H04L 47/746
See application file for complete search history.

(56) References Cited

U.S. PATENT DOCUMENTS

| | | | |
|---|---|---|---|
| 8,782,064 B2 | 7/2014 | Kottomtharayil et al. | |
| 9,110,602 B2 | 8/2015 | Vijayan et al. | |
| 9,444,811 B2 | 9/2016 | Nara et al. | |
| 9,836,342 B1 * | 12/2017 | Mahapatra ............ | G06F 11/202 |
| 10,089,193 B2 | 10/2018 | Kumarasamy et al. | |
| 10,310,950 B2 | 6/2019 | Kochunni et al. | |
| 10,795,852 B2 * | 10/2020 | Pan ....................... | H04L 61/103 |
| 10,817,326 B2 | 10/2020 | Dornemann et al. | |

(Continued)

FOREIGN PATENT DOCUMENTS

| | | |
|---|---|---|
| CN | 110633163 B | 12/2022 |
| TW | I226167 B | 1/2005 |

*Primary Examiner* — Sandarva Khanal

(74) *Attorney, Agent, or Firm* — Moore & Van Allen PLLC; Nicholas C. Russell

(57) ABSTRACT

Crash response assistance in the event of a physical server experiencing a hardware and/or software failure (i.e., crashing) while hosting Virtual Machine (VM) servers. Notification of a physical server hardware and/or software failure triggers acquisition of details about the failure. Based on the crash details, impacted VM servers are identified and validations are performed to determine whether impacted VM servers have recovered to a powered-on state or remain in a powered-off state. Once stakeholders/users and/or support groups associated with the physical server, impacted VM servers and/or applications executing on the impacted VM servers are identified and, service interruption notifications are communicated to the identified stakeholders/users and support groups, which identify at least one impacted VM server and at least one application executing on the identified VM server(s) and whether the VM server has returned to a powered-on state or remains in a powered-off state.

17 Claims, 5 Drawing Sheets

(56)         References Cited

U.S. PATENT DOCUMENTS

| | | | | |
|---|---|---|---|---|
| 10,884,634 | B2 | 1/2021 | Bhagi et al. | |
| 11,294,768 | B2 | 4/2022 | Rana | |
| 11,436,038 | B2 | 9/2022 | Dornemann et al. | |
| 11,460,903 | B2* | 10/2022 | Chen | G06F 9/5094 |
| 2005/0268078 | A1* | 12/2005 | Zimmer | G06F 9/45533 |
| | | | | 713/1 |
| 2011/0107148 | A1* | 5/2011 | Franklin | G06F 11/0748 |
| | | | | 718/1 |
| 2011/0231710 | A1* | 9/2011 | Laor | G06F 11/0778 |
| | | | | 718/1 |
| 2012/0102505 | A1* | 4/2012 | Dunker | G06F 9/5011 |
| | | | | 719/318 |
| 2015/0215178 | A1* | 7/2015 | Javvadi | H04L 41/0853 |
| | | | | 709/224 |
| 2016/0162583 | A1* | 6/2016 | Maddocks | G06F 16/9535 |
| | | | | 707/722 |
| 2016/0239369 | A1* | 8/2016 | Xie | G06F 11/0793 |
| 2016/0239391 | A1* | 8/2016 | Sagiyama | G06F 11/1484 |
| 2018/0041380 | A1* | 2/2018 | Lin | H04L 41/0659 |
| 2018/0367371 | A1* | 12/2018 | Nagarajan | H04L 41/0866 |
| 2018/0373597 | A1 | 12/2018 | Rana | |
| 2019/0075036 | A1* | 3/2019 | Desai | G06F 9/5077 |
| 2019/0243911 | A1 | 8/2019 | Kobozev et al. | |
| 2020/0293404 | A1 | 9/2020 | Mitkar et al. | |
| 2020/0341791 | A1* | 10/2020 | Tsirkin | G06F 1/28 |
| 2022/0171647 | A1* | 6/2022 | Mutha | H04L 43/0876 |
| 2023/0297454 | A1* | 9/2023 | Wang | G06F 11/0709 |
| | | | | 714/1 |
| 2024/0354138 | A1* | 10/2024 | Sherwin, Jr. | G06F 1/3287 |

* cited by examiner

Figure 3:
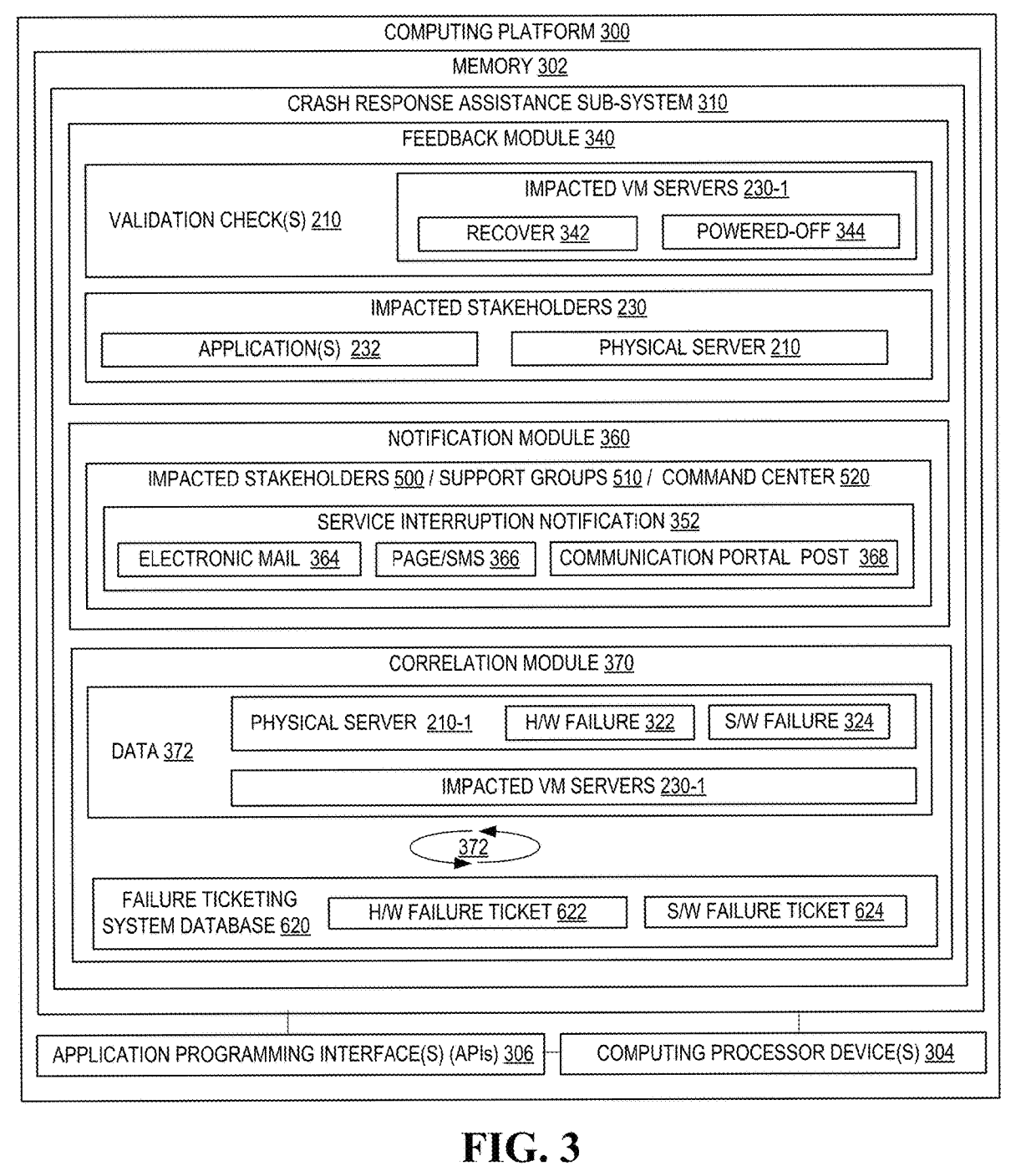

COMPUTING PLATFORM 300

MEMORY 302

CRASH RESPONSE ASSISTANCE SUB-SYSTEM 310

FEEDBACK MODULE 340

VALIDATION CHECK(S) 210

IMPACTED VM SERVERS 230-1

RECOVER 342    POWERED-OFF 344

IMPACTED STAKEHOLDERS 230

APPLICATION(S) 232    PHYSICAL SERVER 210

NOTIFICATION MODULE 360

IMPACTED STAKEHOLDERS 500 / SUPPORT GROUPS 510 / COMMAND CENTER 520

SERVICE INTERRUPTION NOTIFICATION 352

ELECTRONIC MAIL 364    PAGE/SMS 366    COMMUNICATION PORTAL POST 368

CORRELATION MODULE 370

DATA 372

PHYSICAL SERVER 210-1    H/W FAILURE 322    S/W FAILURE 324

IMPACTED VM SERVERS 230-1

372

FAILURE TICKETING SYSTEM DATABASE 620    H/W FAILURE TICKET 622    S/W FAILURE TICKET 624

APPLICATION PROGRAMMING INTERFACE(S) (APIs) 306    COMPUTING PROCESSOR DEVICE(S) 304

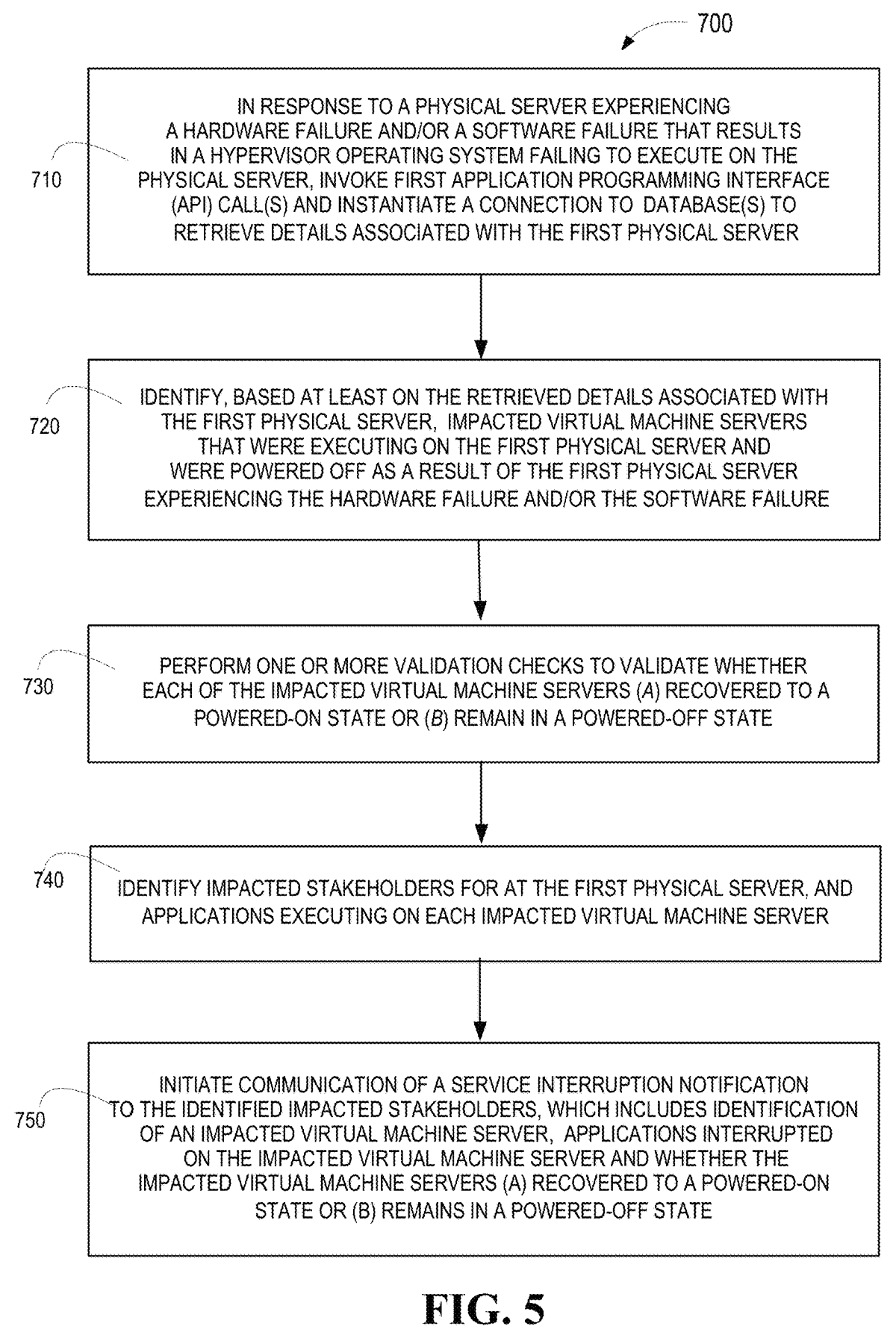

710 — IN RESPONSE TO A PHYSICAL SERVER EXPERIENCING A HARDWARE FAILURE AND/OR A SOFTWARE FAILURE THAT RESULTS IN A HYPERVISOR OPERATING SYSTEM FAILING TO EXECUTE ON THE PHYSICAL SERVER, INVOKE FIRST APPLICATION PROGRAMMING INTERFACE (API) CALL(S) AND INSTANTIATE A CONNECTION TO DATABASE(S) TO RETRIEVE DETAILS ASSOCIATED WITH THE FIRST PHYSICAL SERVER

720 — IDENTIFY, BASED AT LEAST ON THE RETRIEVED DETAILS ASSOCIATED WITH THE FIRST PHYSICAL SERVER, IMPACTED VIRTUAL MACHINE SERVERS THAT WERE EXECUTING ON THE FIRST PHYSICAL SERVER AND WERE POWERED OFF AS A RESULT OF THE FIRST PHYSICAL SERVER EXPERIENCING THE HARDWARE FAILURE AND/OR THE SOFTWARE FAILURE

730 — PERFORM ONE OR MORE VALIDATION CHECKS TO VALIDATE WHETHER EACH OF THE IMPACTED VIRTUAL MACHINE SERVERS (A) RECOVERED TO A POWERED-ON STATE OR (B) REMAIN IN A POWERED-OFF STATE

740 — IDENTIFY IMPACTED STAKEHOLDERS FOR AT THE FIRST PHYSICAL SERVER, AND APPLICATIONS EXECUTING ON EACH IMPACTED VIRTUAL MACHINE SERVER

750 — INITIATE COMMUNICATION OF A SERVICE INTERRUPTION NOTIFICATION TO THE IDENTIFIED IMPACTED STAKEHOLDERS, WHICH INCLUDES IDENTIFICATION OF AN IMPACTED VIRTUAL MACHINE SERVER, APPLICATIONS INTERRUPTED ON THE IMPACTED VIRTUAL MACHINE SERVER AND WHETHER THE IMPACTED VIRTUAL MACHINE SERVERS (A) RECOVERED TO A POWERED-ON STATE OR (B) REMAINS IN A POWERED-OFF STATE

FIG. 5

CRASH RESPONSE ASSISTANCE SYSTEM FOR FAILURES OF PHYSICAL SERVERS HOSTING VIRTUAL MACHINES

FIELD OF THE INVENTION

The present invention is generally directed to server crash response assistance and, more specifically, a system that provides immediate notification to stakeholders, support groups and the like in response to a physical server hosting virtual machine servers crashing/failing.

BACKGROUND

In a private cloud computing infrastructure, a hardware layer (i.e., a physical server or the like) supports a hypervisor layer, also known as a virtualization layer. The hypervisor layer, which serves as a virtual operating system, creates and executes multiple virtual machine (VM) servers and enables multiple different operating systems (e.g., WINDOWS®, LINUX® or the like) to share a single physical host/server by abstracting and managing the hardware resources, such as CPU, memory, storage and the like. In this regard, each operating system is allowed to function as if it is executing on its own dedicated hardware.

The placement of VM servers occur across of cluster/group of physical servers, which are grouped together as a virtual entity (e.g., a virtual stack or the like). In a conventional private cloud computing infrastructure, the VM servers tend to be nomadic and dynamic. This means that if one of the physical servers in a cluster is highly utilized, one or more of the VMs executing on that physical server may be migrated off to a different physical server for load balancing purposes. Such dynamic placement of VM servers is unpredictable in terms of placement (i.e., which physical server the VM server is off-loaded to) and timing.

Every hardware component on the physical server, such as CPU, memory, power supply and like as well software executing on the physical server is susceptible to failure. While certain failures are non-intrusive (i.e., no impact from the server perspective), many failures are intrusive and result in the server crashing and/or service failure (i.e., hypervisor crashing). When the hypervisor crashes due to hardware/software failure or the like, the VM servers executing on the physical server will be migrated to other physical servers in the cluster. In specific instances some services/applications that were running on the VM servers when the physical server crashed are restarted once the VM server migrates to a different physical server. While in other specific instances, other services/applications that were that were running on the VM servers when the physical server crashed remain in a powered-off state until further actions are taken (e.g., remedial actions that ensure that service/application is safe for restart).

The dynamic and unpredictable nature of VM server placement means that when a physical server failure occurs, stakeholders/users, support groups and like are provided minimal in terms of notification. Typically, such notification is very general in nature and does not allow the stakeholders/users, support groups or the like insight into the details of the physical server failure and the impact that the physical server has on their service.

Therefore, a need exists to develop systems, computerized methods and the like that provide immediate and concise notification to stakeholders/user, support groups and the like of the impact that a physical server failure/hypervisor crash has on services executing on virtual machines hosted thereon.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for crash response assistance in the event of a physical server experiencing a hardware and/or software failure (i.e., crashing) while hosting Virtual Machine (VM) servers. Specifically, the system includes a physical server crash register that is configured to receive notification of the hardware and/or software failure of the physical server and, in response, acquires details about the failure. Further, the system includes a physical to virtual/logical device mapping transformer which is configured to identify the impacted VM servers (i.e., the VM servers that were executing on the physical server at the time of the crash) based at least on the acquired details surrounding the crash and perform requisite validations including validating whether impacted virtual machine servers have recovered to a powered-on state (i.e., migrated to another physical server and powered on in the associated cluster or, stated differently, restarted on another physical server in the associated cluster) or remain in a powered-off state. Additionally, the system includes feedback and notification module(s) that is configured to identify stakeholders/users and/or support groups associated with the physical server, impacted VM servers and/or applications executing on the impacted VM servers and, initiate communication of service interruption notifications to the identified stakeholders/users and support groups. The notifications, which may be communicated via email, portal posting, paging/text or the like include, but are not limited to, identification of at least one impacted VM server, at least one application executing on the identified VM server(s) and whether the VM server has returned to a powered-on state or remains in a powered-off state.

In this regard, the service interruption notifications provide a clear and concise means of notifying the application end users/stakeholders and support groups, in real-time or near real-time to the failure occurrence, that their service has been impacted by failure and details related to the failure including whether the VM server (and by way of association, their service) has returned to a powered-on state or remains in a powered-off state.

A system for physical server crash response assistance defines first embodiments of the invention. The system includes a computing cluster that includes a plurality of physical servers. Each of the physical servers executing a hypervisor operating system that is configured to host a plurality of virtual machine servers. The plurality of virtual machine servers execute one of at least two different guest operating systems. The system additionally includes a computing platform having a memory and one or more computing processor devices in communication with the memory. The memory stores a crash response assistance sub-system that is executable by at least one of the one or more computing processor devices.

The crash response assistance sub-system includes a physical server crash register module that is configured to, in response to a first physical server from amongst the plurality of physical servers experiencing at least one of a hardware failure and a software failure that results in the hypervisor operating system failing to execute, invoke one or more first Application Programming Interface (API) calls and instantiate a connection to one or more databases to retrieve details associated with the first physical server. Additionally, the crash response assistance sub-system includes a physical to virtual device mapping transformer module configured to identify, based at least on the retrieved details associated with the first physical server, a plurality of impacted virtual machine servers from amongst the plurality of virtual machine servers that were powered off at the first physical server as a result of the first physical server experiencing the hardware and/or software failure.

In addition, the crash response assistance sub-system includes a feedback module configured to (i) perform one or more validation checks to validate whether each of the plurality of impacted virtual machine servers (a) recovered to a powered-on state or (b) remain in a powered-off state, and (ii) identify impacted stakeholders for the first physical server and/or one or more applications executing on each impacted virtual machine server. Moreover, the crash response assistance sub-system includes a notification module configured to initiate communication of service interruption notification to the identified impacted stakeholders. The service interruption notification includes at least one of the impacted virtual machine servers, one or more applications interrupted on the least one of the impacted virtual machine servers and whether the at least one of the impacted virtual machine servers (a) recovered to a powered-on state or (b) remains in a powered-off state.

In specific embodiments of the system, the physical server crash register module configured to invoke the one or more first Application Programming Interface (API) calls to a Cloud Inventory database to retrieve details associated with the first physical server including one or more of (i) a server region in which the first physical server resides, (ii) a data center within the server region in which the first physical service resides, (iii) a cluster within the data center that includes the first physical server, and (iv) a cluster service offering type for the cluster. In other related embodiments of the system, the physical server crash register module configured to invoke the one or more first Application Programming Interface (API) calls to a configuration management database to retrieve details associated with the first physical server including one or more support groups that manage one or more of (i) the first physical server, (ii) a hardware component related to the hardware failure, and (iii) a software application related to the software failure.

In further specific embodiments of the system, the physical to virtual device mapping transformer module is further configured to invoke one or more second API calls to and instantiate a connection to a Virtual Center database, extract event tokens from records associated with a plurality of physical servers and a plurality of virtual machine servers, execute keyword searches across the extracted event tokens to narrow down search criteria, and identify the plurality of impacted virtual machine servers from the narrowed down search criteria.

Additionally, in further specific embodiments of the system, the physical to virtual device mapping transformer module is further configured to initiate a health check on the plurality of impacted virtual machine servers by pinging each of the plurality of impacted virtual machine servers and receiving a response to the ping as an indication that a corresponding impacted virtual machine server recovered to a powered-on state.

Moreover, in other specific embodiments of the system, the feedback module is further configured to identify a functional environment for each of the one or more applications executing on each impacted virtual machine server and details surrounding the functional environment.

In other specific embodiments of the system, the notification module is further configured to initiate communication of the service interruption notification via at least one of electronic mail, paging or communications portal posting.

In still further specific embodiments of the system includes a correlation module that is configured to receive data related to the physical server failure and the plurality of impacted virtual machine servers and correlate the data with a hardware failure ticket and/or a software failure ticket in a corresponding failure ticketing system database.

A computer-implemented method for physical server crash response assistance defines second embodiments of the invention. The method is executable by one or more computing processor devices. The method includes, in response to a physical server experiencing at least one of a hardware failure and a software failure that results in a hypervisor operating system failing to execute on the physical server, invoking one or more first Application Programming Interface (API) calls and instantiate a connection to one or more databases to retrieve details associated with the first physical server. In addition, the method includes identifying, based at least on the retrieved details associated with the first physical server, a plurality of impacted virtual machine servers that were executing on the first physical server and were powered off as a result of the first physical server experiencing the at least one of the hardware failure and the software failure. Further, the method includes performing one or more validation checks to validate whether each of the plurality of impacted virtual machine servers (a) recovered to a powered-on state or (b) remain in a powered-off state and identifying impacted stakeholders for at least one of the first physical server, and one or more applications executing on each impacted virtual machine server. Additionally, the method includes initiating communication of service interruption notification to the identified impacted stakeholders, wherein the service interruption notification includes at least one of the impacted virtual machine servers, one or more applications interrupted on the least one of the impacted virtual machine servers and whether the at least one of the impacted virtual machine servers (a) recovered to a powered-on state or (b) remains in a powered-off state.

In specific embodiments of the computer-implemented method, invoking the one or more first Application Programming Interface (API) calls to one or more databases to retrieve the details associated with the first physical server further defines the one or more databases as including a Cloud Inventory database and the details associated with the first physical server as including one or more of (i) a server region in which the first physical server resides, (ii) a data center within the server region in which the first physical service resides, (iii) a cluster within the data center that includes the first physical server, and (iv) a cluster service offering type for the cluster. In related embodiments of the computer-implemented method, invoking the one or more first Application Programming Interface (API) calls to one or more databases to retrieve the details associated with the first physical server further defines the one or more databases as including as a configuration management database and the details associated with the first physical server as including one or more support groups that manage one or more of (i) the first physical server, (ii) a hardware component related to the hardware failure, and (iii) a software application related to the software failure.

In further embodiments of the computer-implemented method, identifying the plurality of impacted virtual machine servers further comprises invoking one or more second API calls to and instantiate a connection to a Virtual Center database, extracting event tokens from records associated with a plurality of physical servers and a plurality of virtual machine servers, executing keyword searches across the extracted event tokens to narrow down search criteria, and identifying the plurality of impacted virtual machine servers from the narrowed down search criteria.

In further specific embodiments the computer-implemented method includes initiating a health check on the plurality of impacted virtual machine servers by pinging each of the plurality of impacted virtual machine servers and receiving a response to the ping as an indication that a corresponding impacted virtual machine server has recovered to a powered-on state.

In still further specific embodiments, the computer-implemented method includes identifying a functional environment for each of the one or more applications executing on each impacted virtual machine server and details surrounding the functional environment.

A computer program product including a non-transitory computer-readable medium defines third embodiments of the invention. The non-transitory computer-readable medium includes sets of codes for causing one or more computing devices to, in response to a physical server experiencing at least one of a hardware failure and a software failure that results in a hypervisor operating system failing to execute on the physical server, invoke one or more first Application Programming Interface (API) calls and instantiate a connection to one or more databases to retrieve details associated with the first physical server. The sets of codes further cause the comping device(s) to identify, based at least on the retrieved details associated with the first physical server, a plurality of impacted virtual machine servers that were executing on first physical server and were powered off as a result of the first physical server experiencing the at least one of the hardware failure and the software failure. In addition, the sets of codes further cause the comping device(s) to perform one or more validation checks to validate whether each of the plurality of impacted virtual machine servers (a) recovered to a powered-on state or (b) remain in a powered-off state. Additionally, the sets of codes further cause the comping device(s) to identify impacted stakeholders for at least one of the first physical server, and one or more applications executing on each impacted virtual machine server. Moreover, the sets of codes further cause the comping device(s) to initiate communication of service interruption notification to the identified impacted stakeholders. The service interruption notification includes at least one of the impacted virtual machine servers, one or more applications interrupted on the least one of the impacted virtual machine servers and whether the at least one of the impacted virtual machine servers (a) recovered to a powered-on state or (b) remains in a powered-off state.

In specific embodiments of the computer program product, the set of codes for causing the one or more computing devices to invoke the one or more first Application Programming Interface (API) calls to one or more databases to retrieve the details associated with the first physical server further defines the one or more databases as including a Cloud Inventory database and the details associated with the first physical server as including one or more of (i) a server region in which the first physical server resides, (ii) a data center within the server region in which the first physical service resides, (iii) a cluster within the data center that includes the first physical server, and (iv) a cluster service offering type for the cluster. While in other related embodiments of the computer program product, the set of codes for causing the one or more computing devices to invoke the one or more first Application Programming Interface (API) calls to one or more databases to retrieve the details associated with the first physical server further defines the one or more databases as including as a configuration management database and the details associated with the first physical server as including one or more support groups that manage one or more of (i) the first physical server, (ii) a hardware component related to the hardware failure, and (iii) a software application related to the software failure.

In still further specific embodiments of the computer program product, the sets of codes further include sets of codes for causing the one or more computing devices to invoke one or more second API calls to and instantiate a connection to a Virtual Center database, extract event tokens from records associated with a plurality of physical servers and a plurality of virtual machine servers, execute keyword searches across the extracted event tokens to narrow down search criteria, and identify the plurality of impacted virtual machine servers from the narrowed down search criteria.

In additional specific embodiments of the computer program product, the sets of codes further include a set of code for causing the one or more computing devices to initiate a health check on the plurality of impacted virtual machine servers by pinging each of the plurality of impacted virtual machine servers and receiving a response to the ping as an indication that a corresponding impacted virtual machine server has recovered to a powered-on state.

Moreover, in further specific embodiments of the computer program product, the sets of codes further comprise a set of codes for causing the one or more computing devices to identify a functional environment for each of the one or more applications executing on each impacted virtual machine server and details surrounding the functional environment.

Thus, according to embodiments of the invention, which will be discussed in greater detail below, the present invention addresses needs and/or achieves other advantages by providing crash response assistance in the event of a physical server experiencing a hardware and/or software failure (i.e., crashing) while hosting Virtual Machine (VM) servers. Specifically, the present invention receive notification of the hardware and/or software failure of the physical server and, in response, acquires details about the failure. Based on the crash details, impacted VM servers are identified and validations are performed to determine whether impacted VM servers have recovered to a powered-on state (i.e., migrated to another physical server and powered on in the associated cluster or, stated differently, restarted on another physical server in the associated cluster) or remain in a powered-off state. Additionally, stakeholders/users and/or support groups associated with the physical server, impacted VM servers and/or applications executing on the impacted VM servers are identified and, service interruption notifications are communicated, via email, page/text, portal postings or the like, to the identified stakeholders/users and support groups, which identify at least one impacted VM server and at least one application executing on the identified VM server(s) and whether the VM server has returned to a powered-on state or remains in a powered-off state. Thus, the service interruption notifications provide a clear and concise means of notifying the application end users/stakeholders and support groups, in real-time or near real-time to the failure occurrence, that their service has been impacted by failure and details related to the failure.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
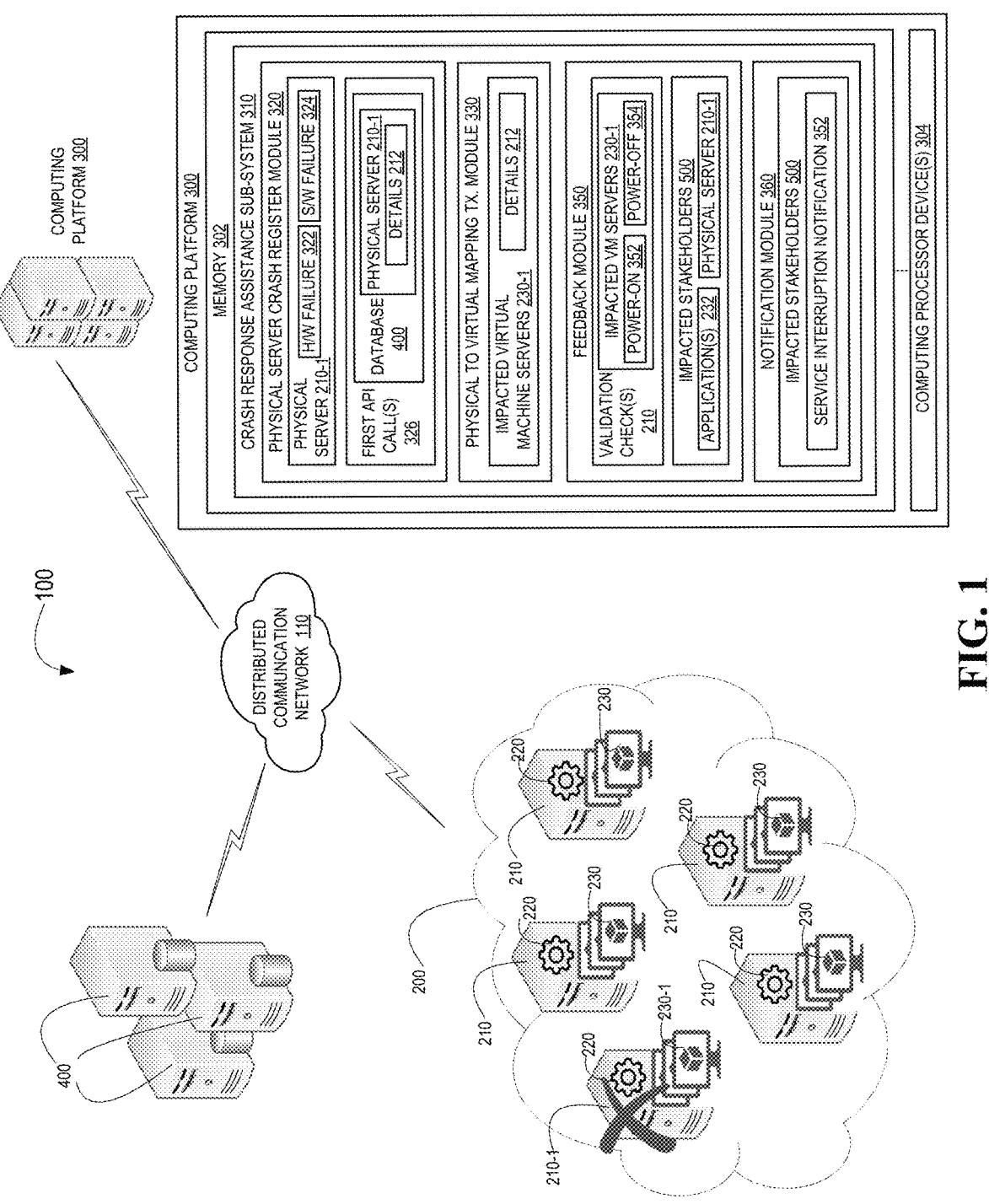
Figure 2:
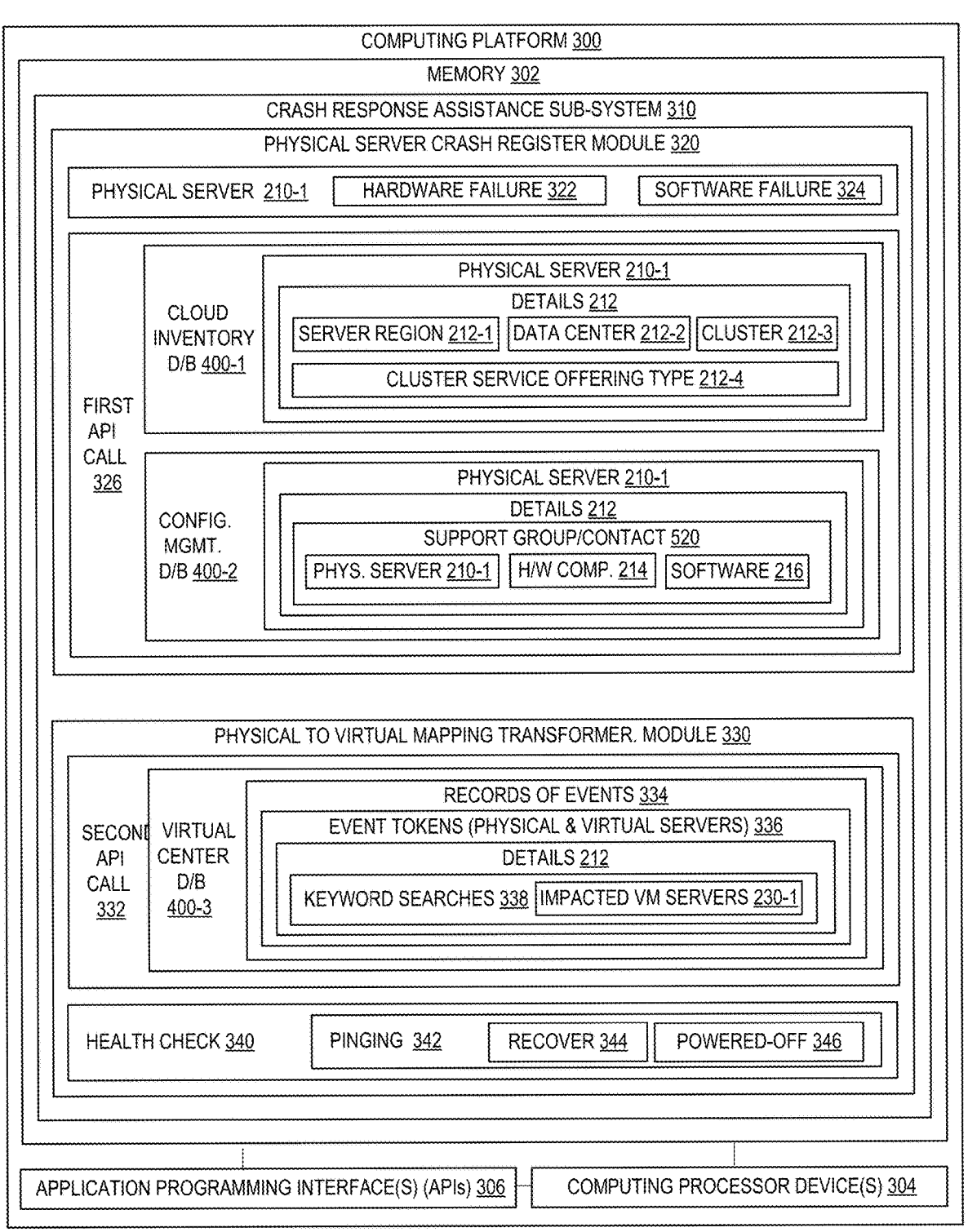
Figure 4:
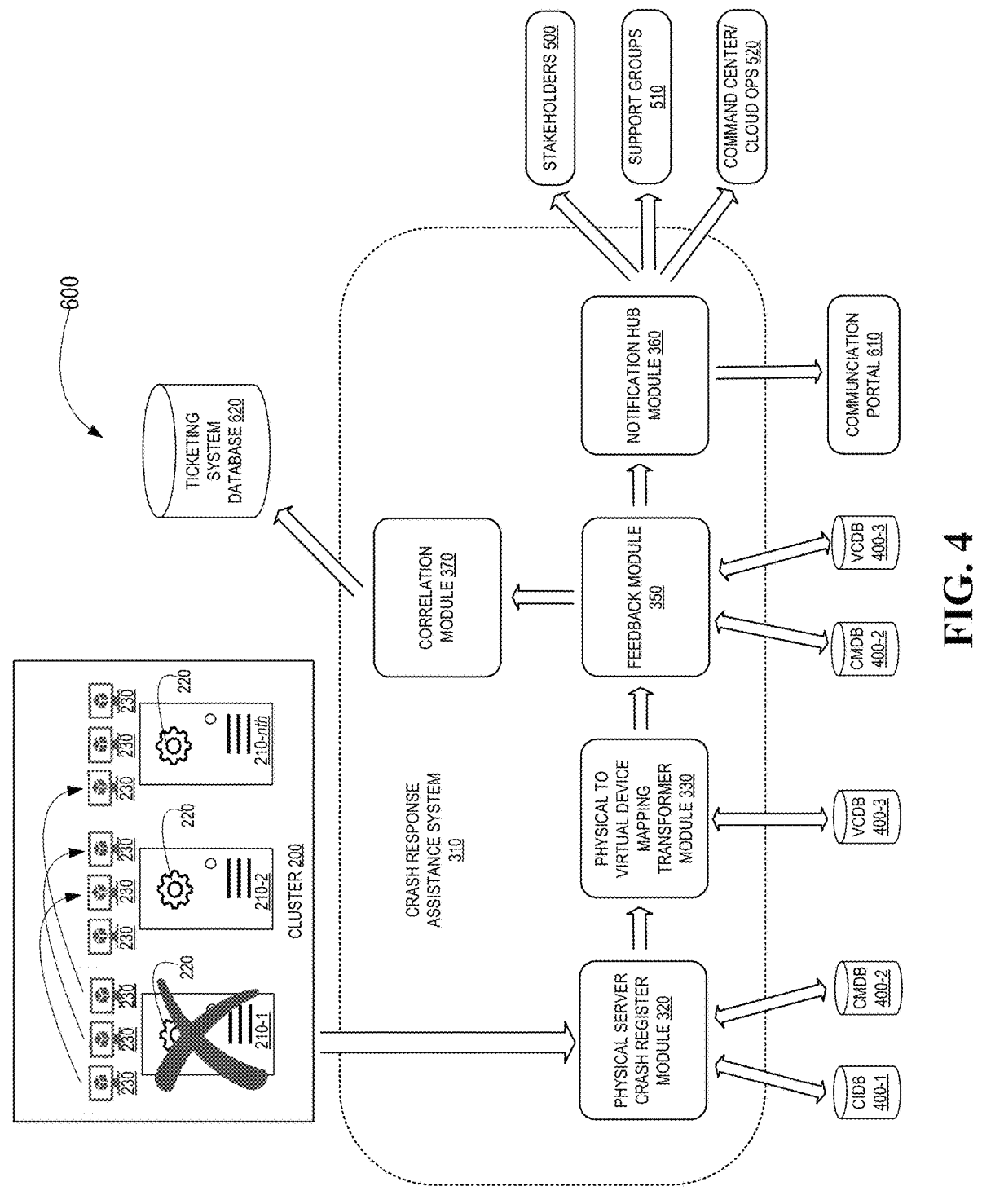

Having thus described embodiments of the disclosure in general terms, reference will now be made to the accompanying drawings, wherein:

FIG. 1 is a schematic/block diagram of a system for crash response assistance in which a physical server hosting virtual machine servers fails/crashes, in accordance with embodiments of the present invention;

FIGS. 2-3 is a block diagram of a computing platform including crash response assistance sub-system, in accordance with alternate embodiments of the present invention;

FIG. 4 is a schematic/flow diagram of a methodology for crash response assistance in which a physical server hosting virtual machine servers fails/crashes, in accordance with embodiments of the invention; and FIG. 5 is a flow diagram of a method for crash response assistance in which a physical server hosting virtual machine servers fails/crashes, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices.

Accordingly, the computing platform includes servers, personal desktop computer, laptop computers, mobile computing devices and the like.

Thus, systems, apparatus, and methods are described in detail below that provide for crash response assistance in the event of a physical server experiencing a hardware and/or software failure (i.e., crashing) while hosting Virtual Machine (VM) servers. Specifically, the system includes a physical server crash register that is configured to receive notification of the hardware and/or software failure of the physical server and, in response, acquires details about the failure. Further, the system includes a physical to virtual/logical device mapping transformer which is configured to identify the impacted VM servers (i.e., the VM servers that were executing on the physical server at the time of the crash) based at least on the acquired details surrounding the crash and perform requisite validations including validating whether impacted virtual machine servers have recovered to a powered-on state (i.e., migrated to another physical server and powered on in the associated cluster or, stated differently, restarted on another physical server in the associated cluster) or remain in a powered-off state. Additionally, the system includes feedback and notification module(s) that is configured to identify stakeholders/users and/or support groups associated with the physical server, impacted VM servers and/or applications executing on the impacted VM servers and, initiate communication of service interruption notifications to the identified stakeholders/users and support groups. The notifications, which may be communicated via email, portal posting, paging/text or the like include, but are not limited to, identification of at least one impacted VM server, at least one application executing on the identified VM server(s) and whether the VM server has returned to a powered-on state or remains in a powered-off state.

In this regard, the service interruption notifications provide a clear and concise means of notifying the application end users/stakeholders and support groups, in real-time or near real-time to the failure occurrence, that their service has been impacted by failure and details related to the failure including whether the VM server (and by way of association, their service) has returned to a powered-on state or remains in a powered-off state.

Referring to FIG. 1, a schematic/block diagram is presented of an exemplary system 100 for computing crash response assistance in physical servers hosting virtual machine servers, in accordance with embodiments of the present invention. System 100 is operable within a distributed communication network 110 which may comprise the Internet, one or more intranets, cellular network(s) or the like. The system includes a cluster 200, which includes a plurality of physical servers 210. Each of the physical servers 210 are configured to execute a hypervisor Operating System (OS) 220, which is configured to host a plurality of virtual machine (VM) servers 230. The hypervisor operating system 220 allows for each of the plurality of VM servers 230 to execute one of at least two different guest operating systems (e.g., WINDOWS®, LINUX® or the like).

System 100 additionally includes a computing platform 300 having a memory 302 and one or more computing processor devices 304 in communication with the memory 302. As shown in FIG. 1, computing platform 300 may comprise multiple computing devices, such as servers/storage units and the like. Memory 302 stores crash response assistance sub-system 310 which is executable by one or more of the computing processor device(s) 304. Crash response assistance sub-system includes a physical server crash register module 320, which is configured to, in response to a first physical server 210-1 from amongst the plurality of physical servers 210 that has experienced at least one of a hardware failure 322 or a software failure 324 (or some other failure, such as a network failure, which causes the hypervisor OS 220 to fail) that resulted in the hypervisor operating system 220-1 failing to execute, invoke one or more first Application Programming Interface (API) call(s) 326 and instantiate a connection to one or more databases 400 to retrieve details 212 associated with the failure 322 and/or 324 experienced by the first physical server 210-1.

Crash response assistance sub-system additionally includes a physical to virtual device mapping transformer module 330 which is configured to identify, based at least on the retrieved details 212 associated with the first physical server 210-1, a plurality of impacted VM servers 230-1 from amongst the plurality of VM servers 230. An "impacted" VM server 230 as used herein is a VM server that was powered-off as a result of a physical server 210 experiencing the hardware failure 322 and/or software 324 (or some other failure, such as a network failure, which causes the hypervisor OS 220 to fail).

Additionally, crash response assistance sub-system includes a feedback module 350, which is configured to perform one or more validation checks 210 to validate whether each of the plurality of impacted VM servers 230-1 (i) recovered to a power-on state 352 or (ii) remain in a power-off state 354. Recovery to a power-on state 352 entails migration of an impacted VM server 230-1 to another physical server 210/hypervisor OS 220 within the cluster 200 of physical servers 210. In certain instances, applications executing on an impacted VM server 230-1 or other factors may dictate that the impacted VM server 230-1 remain in a power-off state 354 until further analysis can be performed to understand the details of the impact and the like. In addition, feedback module 350, which is further configured identify impacted stakeholders/users 500 related to the first physical server 210-1 and/or applications 232 executing on the impacted VM servers 230-1.

In addition, crash response assistance sub-system includes a notification module 360 which is configured to initiate communication of a service interruption notification 352 to, at least, the identified impacted stakeholders 500. In specific embodiments of the invention, communication of the service interruption notification 353 occurs in real-time or near real-time to the first physical server 210-1 experiencing the hardware/software failure 322/324. The service interruption notification 352 includes, but is not limited to, identification of at least impacted VM server 230-1 and one or more applications 232 interrupted on the impacted VM server(s) 230-1 and denotes whether the impacted VM server(s) 230-1 recovered to a power-on state 352 or remain in a power-off state 354.

Referring to FIGS. 2-3, block diagrams are depicted of computing platform 300 highlighting various alternate embodiments of the crash response assistance sub-system 310, in accordance with embodiments of the present invention. As previously discussed in relation to FIG. 1, computing platform 300 may comprise one or multiple computing devices, such as servers, storage devices or the like. As further previously discussed, computing platform 300 includes memory 302, which may comprise volatile and/or non-volatile memory, such as read-only memory (ROM) and/or random-access memory (RAM), EPROM, EEPROM, flash cards, or any memory common to computing platforms. Moreover, memory 302 may comprise cloud storage, such as provided by a cloud storage service and/or a cloud connection service.

Further, computing platform 300 includes one or more computing processor devices 304, which may be an application-specific integrated circuit ("ASIC"), or other chipset, logic circuit, or other data processing device. Computing processor device(s) 304 may execute one or more application programming interface (APIs) 306 that interface with any resident programs, such as crash response assistance sub-system 310 or the like, stored in memory 302 of computing platform 300 and any external programs. Computing platform 300 may include various processing subsystems (not shown in FIGS. 2-3) embodied in hardware, firmware, software, and combinations thereof, that enable the functionality of computing platform 300 and the operability of computing platform 300 on a distributed communication network 110 (shown in FIG. 1). For example, processing sub-systems allow for initiating and maintaining communications and exchanging data with other networked devices. For the disclosed aspects, processing sub-systems of computing platform 300 may include any processing sub-system portion used in conjunction with crash response assistance sub-system 310 and related tools, routines, subroutines, applications, sub-applications, sub-modules thereof.

In specific embodiments of the present invention, computing platform 300 additionally includes a communications module (not shown in FIGS. 2-3) embodied in hardware, firmware, software, and combinations thereof, that enables electronic communications between components of computing platform 300 and other networks and network devices. Thus, communication module may include the requisite hardware, firmware, software and/or combinations thereof for establishing and maintaining a network communication connection with one or more devices and/or networks.

As previously discussed in relation to FIG. 1, memory 302 of computing platform 300 stores crash response assistance sub-system 310, which is executable by one or more computing processing devices 304. Crash response assistance sub-system includes a physical server crash register module 320, which is configured to, in response to a first physical server 210-1 from amongst the plurality of physical servers 210 that has experienced at least one of a hardware failure 322 or a software failure 324 (or some other failure, such as a network failure, which causes the hypervisor OS 220 to fail) that resulted in the hypervisor operating system 220-1 failing to execute, invoke one or more first Application Programming Interface (API) call(s) 326 and instantiate a connection to one or more databases 400 to retrieve details 212 associated with the failure 322 and/or 324 experienced by the first physical server 210-1. In specific embodiments of the invention, first Application Programming Interface (API) call(s) are invoked and connections instantiated with a cloud inventory database (CIDB) 400-1 within a virtual center (e.g., a centralized console that manages hypervisors 230) or the like to retrieve details 212 that include, but are not limited to, (i) the server region 212-1 in which the physical server 210-1 resides, (ii) the data center 212-2 within the server region 212-1, (iii) the cluster 212-3 within the data center 212-2 and the cluster service offering type 212-4 within the cluster 212-3. The cluster service offering type 212-4 provides insight into the storage allocated to a Virtual Machine (VM) server.

In additional embodiments of the system 100, physical server crash register module 320 is configured to invoke first Application Programming Interface (API) call(s) 326 and instantiate connections with a configurations management database (CMDB) 400-2 to retrieve details 212 that include, but are not limited to, support groups and or contacts within the support group that manage the physical server 210-1, and/or hardware component 214 and/or software component 216 that failed.

Crash response assistance sub-system additionally includes a physical to virtual device mapping transformer module 330 which is configured to identify, based at least on the retrieved details 212 associated with the first physical server 210-1, a plurality of impacted VM servers 230-1 from amongst the plurality of VM servers 230. An "impacted" VM server 230 as used herein is a VM server that was powered-off as a result of a physical server 210 experiencing the hardware failure 322 and/or software 324 (or some other failure, such as a network failure, which causes the hypervisor OS 220 to fail). In specific embodiments of the system 100, physical to virtual device mapping transformer module 330 which is configured to invoke second API calls 332 and instantiate a connection with a Virtual Center database (VCDB) 400-3 to extract event tokens 336 from records of events 334 associated with the plurality of physical servers 210 and the plurality of VM servers 230. In response to extracting the event tokens 336, module 330 is configured to execute keyword searches 338 across the extracted event tokens to narrow down search criteria and subsequently identify the plurality of impacted VM servers 230-1 and related data from the narrowed down search criteria.

In specific embodiments of the system 100, the guest operating system of an impacted VM server (as determined through the data mining operation described above) will determine what parameters require validation. As such, physical to virtual device mapping transformer module 330 is configured to perform a health check 340 to determine whether the impacted VM servers 230-1 have recovered to a powered-on state 344 or remain in a powered-off state 346. In specific embodiments of the system 100, the health check 340 entails pinging 342 the impacted VM servers 230-1 to determine whether the impacted VM servers 230-1 respond to the ping. In response to determining that impacted VM servers 230-1 have recovered to a powered-on state 344, a determination is made as to when (i.e., point in time) the impacted VM server(s) 230-1 restarted/recovered.

Referring to FIG. 3, additionally, crash response assistance sub-system includes a feedback module 350, which is configured to perform one or more validation checks 210 to validate whether each of the plurality of impacted VM servers 230-1 (i) recovered to a power-on state 352 or (ii) remain in a power-off state 354. Recovery to a power-on state 352 entails migration of an impacted VM server 230-1 to another physical server 210/hypervisor OS 220 within the cluster 200 of physical servers 210. In certain instances, applications executing on an impacted VM server 230-1 or other factors may dictate that the impacted VM server 230-1 remain in a power-off state 354 until further analysis can be performed to understand the details of the impact and the like. In addition, feedback module 350, which is further configured identify impacted stakeholders/users 500 related to the first physical server 210-1 and/or applications 232 executing on the impacted VM servers 230-1. Such identification may occur by invoking API calls and instantiating connections to the CMDB 400-2 and or VCDB 400-3 or the like. Additionally, such calls/connections to the CMDB 400-2 and or VCDB 400-3 may be made to retrieve data related to the applications 232 executing on the impacted VM servers 230-1 such as, but not limited to, the priority/criticality of the applications 232, the environment (e.g., development, test, production or the like) in which the applications are running and details surrounding the environment.

In addition, crash response assistance sub-system includes a notification module 360 which is configured to initiate communication of a service interruption notification 352 to, at least, the identified impacted stakeholders 500. In specific embodiments of the invention, communication of the service interruption notification 353 occurs in real-time or near real-time to the first physical server 210-1 experiencing the hardware/software failure 322/324. The service interruption notification 352 includes, but is not limited to, identification of at least impacted VM server 230-1 and one or more applications 232 interrupted on the impacted VM server(s) 230-1 and denotes whether the impacted VM server(s) 230-1 recovered to a power-on state 352 or remain in a power-off state 354. In specific embodiments of the system 100, the service interruption notifications 353 are communicated via any feasible communication channel, such as, but not limited to, electronic mail (i.e., email) 364, paging system/Short Message Service (SMS)/text 366 and/or communication portal posting 368.

In specific embodiments system 100 additionally includes a correlation module 370 which may be included within the crash response assistance sub-system or, as depicted in FIGS. 3 and 4, or may be a stand-alone entity. Correlation module 370 is in communication with a failure ticketing system database 620 that stores hardware failure tickets 622 and/or software failures tickets 624 for the hardware and software failures experienced by the physical servers 210. In this regard, a ticket is opened and stored in the database 620 in response to the failure so that the failure is addressed (e.g., hardware component replaced, software revised, failure analysis performed to prevent recurring failures and the like). Correlation module 370 is configured to receive data 372 related to the physical server 210-1 failure 322 and/or 324 and the plurality of impacted virtual machine servers 230-1 and correlate the data 372 with at least one of a hardware failure ticket 622 and a software failure ticket 624 in a corresponding failure ticketing system database 620.

Referring to FIG. 4, a schematic/flow diagram is depicted of a methodology 600 for crash response assistance for crashes occurring in physical servers hosting VM servers, in accordance with embodiments of the present invention. A cluster 200 comprises multiple physical servers 210-1, 210-2 and 210-nth, with each physical server 210 in the cluster 200 configured to execute a hypervisor Operating System (OS) 220. The hypervisor OS 220 is configured to host a plurality of virtual machine (VM) servers 230. The hypervisor OS 220 allows for each of the plurality of VM servers 230 to execute one of at least two different guest operating systems (e.g., WINDOWS®, LINUX® or the like). In response to physical server 210-1 experiencing a hardware and/or software failure, the physical server crash register module 320 of crash response assistance system 310 (i.e., previously referred to as a sub-system) is configured to invoke API calls and instantiate connection with one or more databases 400 to retrieve details associated with the failure. Specifically, physical server crash register module 320 is configured invoke an API call and connect with CIDB 400-1 to retrieve data related to the location of the physical server 210-1, such as server region, data center within the server region, cluster within the data center and cluster service offering type. Additionally, physical server crash register module 320 is configured invoke an API call and connect with CMBD 400-2 to retrieve related to the support groups and/or stakeholders/users supporting/using the physical server and/or hardware/software components.

In response to retrieving the requisite data, physical to virtual device mapping transformer module 330 is configured to identify the VM servers that were executing on the physical server at the time of the failure, as well as the applications running on those VM servers. In specific embodiments of the invention, such identification of the VM servers is accomplished by invoking API calls and making connections with VCDB 400-3 to run keyword query searches on issued tokens within a records database to narrow down the search space/criteria and auto-filter out unwanted data (i.e., data that does not pertain to impacted VM servers). Once the VM servers have been identified they are cross-referenced to a Cloud database to data mine guest OS type of specific impacted VM servers. The guest OS type determines what parameters require validation (e.g., what VM servers require a health check and or validation check to determine whether the VM server has recovered to a powered-on state or remains in a powered-off state.

In response to identifying the VM servers (i.e., mapping the physical server to impacted VM servers), feedback module 340 is configured to perform necessary validation, such as a health check on the state of the impacted VM servers and the like. Moreover, an asynchronous run is performed on the impacted VM server list (as identified from VCDB 400-3) and cross-referenced with details retrieved from CMBD 400-2 to determine who are the application stakeholders/owners, who is the first level of contact for a specific application, the working environment of the application and details surrounding the environment and what group supports the physical server and/or VM server from an OS standpoint as well as from an environment standpoint and the like. Moreover, the feedback module may perform health checks, such as pinging VM servers to determine their current state (i.e., powered-on vs. powered-off).

Notification hub module 360 is configured to generate and initiate communication of service interruption notifications to identified stakeholders 500, support groups 510 and command center/cloud operations 520. The communications may be sent via email, test/SMS, page or the like. In addition, service interruption notifications may be posted to communication portal 610. The notifications may include any and all details surrounding the physical server failure, hypervisor failure, VM server failure and/or application/service interruption including, but not limited to, identification of the physical server, VM server, application/service, time period of the interruption whether the service is back running (i.e., VM server returned to powered-on state) or remains down (i.e., VM server remains in powered-off state).

In addition, correlation module 370 receives data from feedback module 350 and is configured to correlate the data for inclusion within a ticketing system database 620 so that the data mined for the notifications can be of benefit to individuals and/or systems handling disposition of a hardware or software failure ticket.

Referring to FIG. 5, a flow diagram is a depicted of a method 700 for physical server crash response assistance, in accordance with embodiments of the present invention. In response to a physical server experiencing at least one of a hardware failure and a software failure that results in a hypervisor operating system failing to execute on the physical server, at Event 710, one or more first Application Programming Interface (API) calls are invoked and a connection is made to one or more databases to retrieve details associated with the at least one of hardware failure and software failure experienced by the first physical serve. The details may include, but are not limited to, the location of the physical server in terms of server region, data center, cluster as well as cluster service offering type and support groups that manage the physical server and/or hardware/software.

In response to retrieving the details, at Event 720, a plurality of impacted VM servers are identified/mapped to the physical server based at least on the retrieved details associated with the physical server. An impacted VM server being a VM server that was executing on the physical server at the time of the failure/crash and was powered off as a result of the first physical server experiencing the at least one of the hardware failure and the software failure. At Event 730, one or more validation/health checks are performed to validate (ensure the health of VM server) whether each impacted VM server (a) recovered to a powered-on state or (b) remain in a powered-off state.

At Event 740, impacted stakeholders/users are identified for at least one of the first physical server, and one or more applications executing on each impacted virtual machine server and, in response to impacted stakeholder identification, at Event 750, service interruption notification communication is initiated to the identified impacted stakeholders. The service interruption notification includes at least one of identification of the impacted virtual machine servers and/or one or more applications interrupted on the least one of the impacted virtual machine servers and whether the at least one of the impacted virtual machine servers (a) recovered to a powered-on state or (b) remains in a powered-off state.

Thus, as described in detail above, present embodiments of the invention include systems, methods, computer program products and/or the like that provide crash response assistance in the event of a physical server experiencing a hardware and/or software failure (i.e., crashing) while hosting Virtual Machine (VM) servers. Specifically, the present invention receive notification of the hardware and/or software failure of the physical server and, in response, acquires details about the failure. Based on the crash details, impacted VM servers are identified and validations are performed to determine whether impacted VM servers have recovered to a powered-on state (i.e., migrated to another physical server and powered on in the associated cluster or, stated differently, restarted on another physical server in the associated cluster) or remain in a powered-off state. Additionally, stakeholders/users and/or support groups associated with the physical server, impacted VM servers and/or applications executing on the impacted VM servers are identified and, service interruption notifications are communicated, via email, page/text, portal postings or the like, to the identified stakeholders/users and support groups, which identify at least one impacted VM server and at least one application executing on the identified VM server(s) and whether the VM server has returned to a powered-on state or remains in a powered-off state. Thus, the service interruption notifications provide a clear and concise means of notifying the application end users/stakeholders and support groups, in real-time or near real-time to the failure occurrence, that their service has been impacted by failure and details related to the failure.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for physical server crash response assistance, the system comprising:

a cluster comprising a plurality of physical servers, each of the plurality of physical servers executing a hypervisor operating system that is configured to host a plurality of virtual machine servers, wherein the plurality of virtual machine servers execute one of at least two different guest operating systems; and a computing platform including a memory and one or more computing processor devices in communication with the memory, wherein the memory stores a crash response assistance sub-system that is executable by at least one of the one or more computing processor devices and includes:

a physical server crash register module configured to, in response to a first physical server from amongst the plurality of physical servers experiencing at least one of a hardware failure and a software failure that results in the hypervisor operating system failing to execute, invoke one or more first Application Programming Interface (API) calls and instantiate a connection to one or more databases to retrieve details associated with the at least one of the hardware failure and the software failure experienced by the first physical server, a physical to virtual device mapping transformer module configured to identify, based at least on the retrieved details associated with the at least one of the hardware failure and the software failure experienced by the first physical server, a plurality of impacted virtual machine servers from amongst the plurality of virtual machine servers that were powered off as a result of the first physical server experiencing the at least one of the hardware failure and the software failure by:

invoking one or more second API calls to and instantiating a connection to a Virtual Center database, extracting event tokens from records associated with the plurality of physical servers and the plurality of virtual machine servers, executing keyword searches across the extracted event tokens to narrow down search criteria, and identifying the plurality of impacted virtual machine servers from the narrowed down search criteria, a feedback module configured to (i) perform one or more validation checks to validate whether each of the plurality of impacted virtual machine servers (a) recovered to a powered-on state after migrating to another server in the cluster or (b) remain in a powered-off state, and (ii) identify impacted stakeholders for at least one of the first physical server, and one or more applications executing on each impacted virtual machine server, and a notification module configured to initiate communication of service interruption notification to the identified impacted stakeholders, wherein the service interruption notification includes at least one of the impacted virtual machine servers, one or more applications interrupted on the least one of the impacted virtual machine servers and whether the at least one of the impacted virtual machine servers (a) recovered to a powered-on state after migrating to another server in the cluster or (b) remains in a powered-off state.

2. The system of claim 1, wherein the physical server crash register module configured to invoke the one or more first Application Programming Interface (API) calls to one or more databases to retrieve details associated with the first physical server, wherein the one or more databases include a Cloud Inventory database and the details associated with the first physical server include one or more of (i) a server region in which the first physical server resides, (ii) a data center within the server region in which the first physical service resides, (iii) a cluster within the data center that includes the first physical server, and (iv) a cluster service offering type for the cluster.

3. The system of claim 1, wherein the physical server crash register module configured to invoke the one or more first Application Programming Interface (API) calls to one or more databases to retrieve details associated with the first physical server, wherein the one or more databases include a configuration management database and the details associated with the first physical server include one or more support groups that manage one or more of (i) the first physical server, (ii) a hardware component related to the hardware failure, and (iii) a software application related to the software failure.

4. The system of claim 1, wherein the physical to virtual device mapping transformer module is further configured to initiate a health check on the plurality of impacted virtual machine servers by pinging each of the plurality of impacted virtual machine servers and receiving a response to the ping as an indication that a corresponding impacted virtual machine server recovered to a powered-on state after migrating to another server in the cluster.

5. The system of claim 1, wherein the feedback module is further configured to identify a functional environment for each of the one or more applications executing on each impacted virtual machine server and details surrounding the functional environment.

6. The system of claim 1, wherein the notification module is further configured to initiate communication of the service interruption notification via at least one of electronic mail, paging or communications portal posting.

7. The system of claim 1, wherein the crash response assistance subsystem further comprises a correlation module configured to receive data related to the at least one of the hardware failure and the software failure experienced by the physical server and the plurality of impacted virtual machine servers and correlate the data with at least one of a hardware failure ticket and a software failure ticket in a corresponding failure ticketing system database.

8. A computer-implemented method for physical server crash response assistance, the computer-implemented method is executable by one or more computing processor devices and comprises:

in response to a physical server experiencing at least one of a hardware failure and a software failure that results in a hypervisor operating system failing to execute on the physical server, invoking one or more first Application Programming Interface (API) calls and instantiating a connection to one or more databases to retrieve details associated with the at least one of hardware failure and software failure experienced by a first physical server;

identifying, based at least on the retrieved details associated with the first physical server, a plurality of impacted virtual machine servers that were executing on the first physical server and were powered off as a result of the first physical server experiencing the at least one of the hardware failure and the software failure, wherein identifying further comprises:

invoking one or more second API calls to and instantiating a connection to a Virtual Center database;

extracting event tokens from records associated with the plurality of physical servers and the plurality of virtual machine servers;

executing keyword searches across the extracted event tokens to narrow down search criteria; and identifying the plurality of impacted virtual machine servers from the narrowed down search criteria;

performing one or more validation checks to validate whether each of the plurality of impacted virtual machine servers (a) recovered to a powered-on state after migrating to another server in a corresponding cluster or (b) remain in a powered-off state;

identifying impacted stakeholders for at least one of the first physical server, and one or more applications executing on each impacted virtual machine server; and initiating communication of service interruption notification to the identified impacted stakeholders, wherein the service interruption notification includes at least one of the impacted virtual machine servers, one or more applications interrupted on the least one of the impacted virtual machine servers and whether the at least one of the impacted virtual machine servers (a) recovered to a powered-on state after migrating to another server in the corresponding cluster or (b) remains in a powered-off state.

9. The computer-implemented method of claim 8, wherein invoking the one or more first Application Programming Interface (API) calls to one or more databases to retrieve the details associated with the first physical server further defines the one or more databases as including a Cloud Inventory database and the details associated with the first physical server as including one or more of (i) a server region in which the first physical server resides, (ii) a data center within the server region in which the first physical service resides, (iii) a cluster within the data center that includes the first physical server, and (iv) a cluster service offering type for the cluster.

10. The computer-implemented method of claim 8, wherein invoking the one or more first Application Programming Interface (API) calls to one or more databases to retrieve the details associated with the first physical server further defines the one or more databases as including as a configuration management database and the details associated with the first physical server as including one or more support groups that manage one or more of (i) the first physical server, (ii) a hardware component related to the hardware failure, and (iii) a software application related to the software failure.

11. The computer-implemented method of claim 8, further comprising: initiating a health check on the plurality of impacted virtual machine servers by pinging each of the plurality of impacted virtual machine servers and receiving a response to the ping as an indication that a corresponding impacted virtual machine server has recovered to a powered-on state after migrating to another server in the corresponding cluster.

12. The computer-implemented method of claim 8, further comprising: identifying a functional environment for each of the one or more applications executing on each impacted virtual machine server and details surrounding the functional environment.

13. A computer program product including a non-transitory computer-readable medium, the non-transitory computer-readable medium comprising sets of codes for causing one or more computing devices to:

in response to a physical server experiencing at least one of a hardware failure and a software failure that results in a hypervisor operating system failing to execute on the physical server, invoke one or more first Application Programming Interface (API) calls and instantiate a connection to one or more databases to retrieve details associated with the at least one of hardware failure and software failure experienced by a first physical server;

identify, based at least on the retrieved details associated with the first physical server, a plurality of impacted virtual machine servers that were executing on the first physical server and were powered off as a result of the first physical server experiencing the at least one of the hardware failure and the software failure, wherein identifying further comprises:

invoking one or more second API calls to and instantiating a connection to a Virtual Center database, extracting event tokens from records associated with the plurality of physical servers and a plurality of virtual machine servers, executing keyword searches across the extracted event tokens to narrow down search criteria, and identifying the plurality of impacted virtual machine servers from the narrowed down search criteria;

perform one or more validation checks to validate whether each of the plurality of impacted virtual machine servers (a) recovered to a powered-on state after migrating to another server in a corresponding cluster or (b) remain in a powered-off state;

identify impacted stakeholders for at least one of the first physical server, and one or more applications executing on each impacted virtual machine server; and initiate communication of service interruption notification to the identified impacted stakeholders, wherein the service interruption notification includes at least one of the impacted virtual machine servers, one or more applications interrupted on the least one of the impacted virtual machine servers and whether the at least one of the impacted virtual machine servers (a)

recovered to a powered-on state after migrating to another server in the corresponding cluster or (b) remains in a powered-off state.

14. The computer program product of claim 13, wherein the set of codes for causing the one or more computing devices to invoke the one or more first Application Programming Interface (API) calls to one or more databases to retrieve the details associated with the first physical server further defines the one or more databases as including a Cloud Inventory database and the details associated with the first physical server as including one or more of (i) a server region in which the first physical server resides, (ii) a data center within the server region in which the first physical service resides, (iii) a cluster within the data center that includes the first physical server, and (iv) a cluster service offering type for the cluster.

15. The computer program product of claim 13, wherein the set of codes for causing the one or more computing devices to invoke the one or more first Application Programming Interface (API) calls to one or more databases to retrieve the details associated with the first physical server further defines the one or more databases as including as a configuration management database and the details associated with the first physical server as including one or more support groups that manage one or more of (i) the first physical server, (ii) a hardware component related to the hardware failure, and (iii) a software application related to the software failure.

16. The computer program product of claim 13, wherein the sets of codes further comprise a set of codes for causing the one or more computing devices to: initiate a health check on the plurality of impacted virtual machine servers by pinging each of the plurality of impacted virtual machine servers and receiving a response to the ping as an indication that a corresponding impacted virtual machine server has recovered to a powered-on state after migrating to another server in the corresponding cluster.

17. The computer program product of claim 13, wherein the sets of codes further comprise a set of codes for causing the one or more computing devices to: identify a functional environment for each of the one or more applications executing on each impacted virtual machine server and details surrounding the functional environment.

* * * * *